Jan. 16, 1968  J. E. BLONSKY  3,363,713
ELLIPTICAL-WHEELED VEHICLE
Filed Oct. 22, 1965

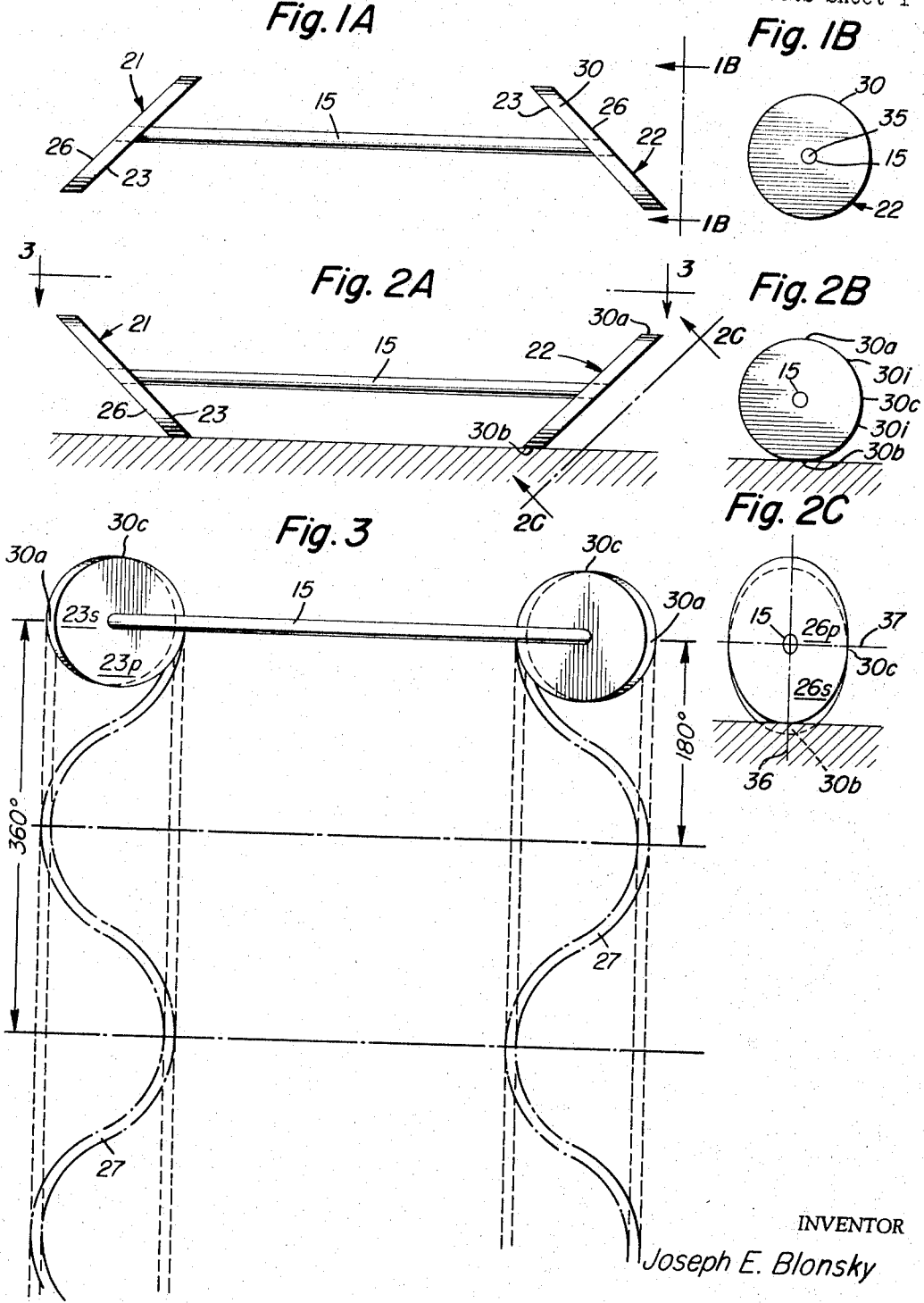

INVENTOR
Joseph E. Blonsky
BY
AGENT

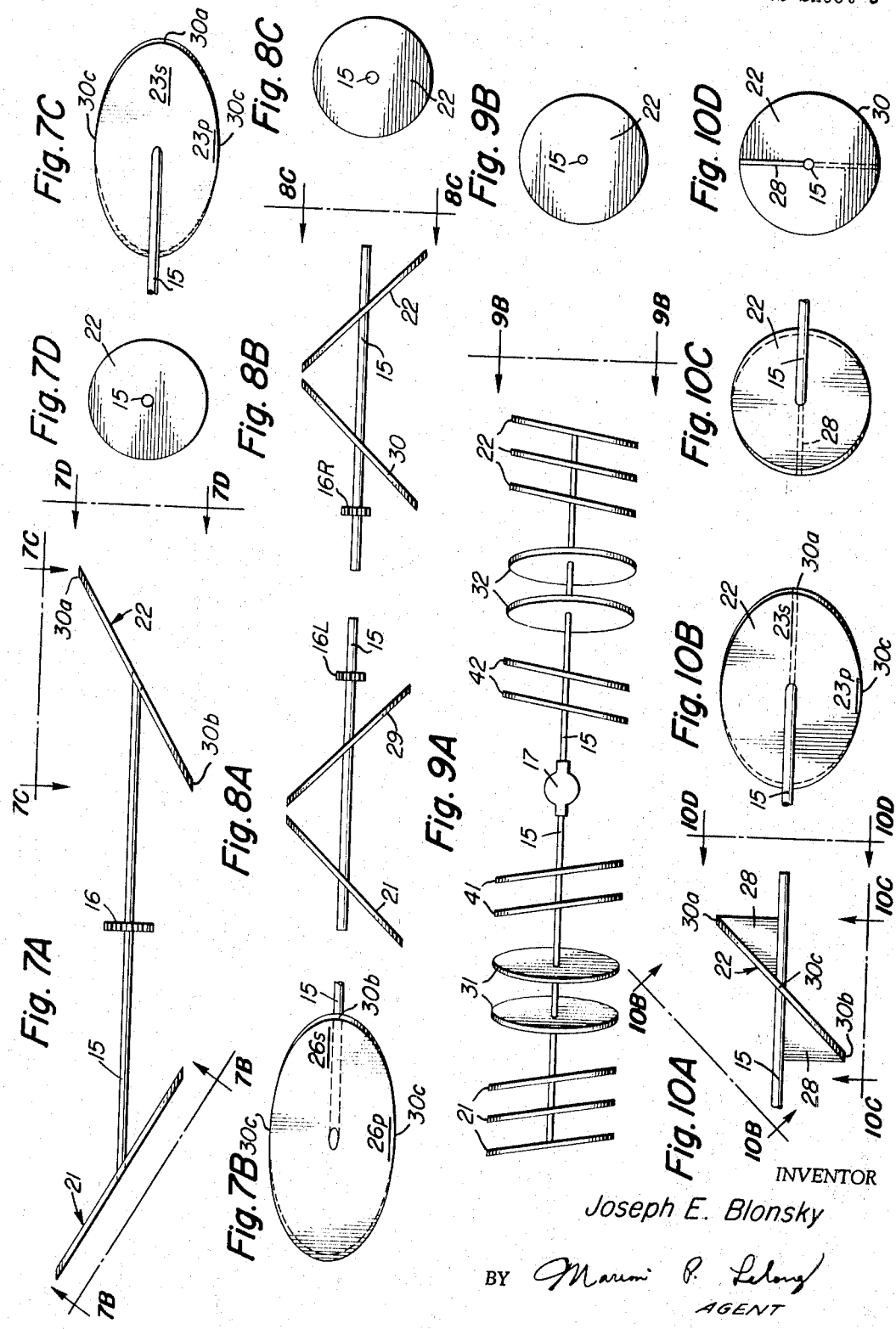

INVENTOR
Joseph E. Blonsky

United States Patent Office

3,363,713
Patented Jan. 16, 1968

3,363,713
ELLIPTICAL-WHEELED VEHICLE
Joseph E. Blonsky, Summerville, S.C., assignor to West Virginia Pulp and Paper Company, New York, N.Y., a corporation of Delaware
Filed Oct. 22, 1965, Ser. No. 501,640
1 Claim. (Cl. 180—93)

ABSTRACT OF THE DISCLOSURE

Ann elliptical-wheeled, articulated motor vehicle having a load-carrying body and a propulsion section that comprises a semi-circular frame member supporting an elevated cab, a power-transmitting axle that is rotatably attached to the frame member, and a pair of mutually opposed planar drive wheels of elliptical shape that are rigidly attached to the axle at the complement of the ellipticity thereof, a differential at the midpoint of the axle being attached to the transmission of an engine in the elevated cab by a vertically aligned driveshaft.

---

This invention relates to a new type of vehicle and particularly relates to a new wheel-axle combination for supporting and impelling motor vehicles over yielding terrain.

Conventional wheels sometimes have difficulty in supporting and impelling motor vehicles over yielding terrain, such as snow, mud, and sand of sufficient depth, softness, and flowability. The most commonly used development for coping with these difficulties has been the enclosure of a plurality of wheels within an endless belt or track of substantial width and surface roughness.

Circular wheels with dished spokes and hub, which operate at an angle to the ground enabling the load-bearing spokes to be vertical, are described in U.S. Patents 191,286 by J. Humphrey, 387,551 by H. A. Arnold, and 413,677 by J. W. Maloy. Walk wheels of elliptical shape, which are perpendicular to the terrain and to the attached axle, are described in U.S. Patents 2,711,221 and 2,256,570 by J. F. Kopczynski. These wheels tend to impart an up-and-down motion to the vehicle they support. Hemispherical wheels having tilted axles, such as are described by E. P. Aghnides in U.S. Patents 2,372,043, 2,967,581, 3,043,391, and 3,147,816 have been invented to provide flotation and propulsive power. Non-wheel developments have sometimes utilized the auger principle. For example, elongated metal pontoons fillted with exterior spiral blades, which support and are aligned with the hull of a boat-type vehicle, can impel this vehicle over water or yielding terrain by rotation thereof.

No wheel-axle combination, wheel means, or vehicle has yet been provided which uses elliptical wheels to impart a level ride, provide improved flotation, and develop increased impelling capability over yielding terrain.

The object of this invention is to provide a novel combination of elliptical wheels and an axle for supporting and impelling vehicles over yielding terrain.

Another object of this invention is to provide a novel motor vehicle having an elliptical wheel-axle combination which has exceptional capability for supporting and impelling the vehicle over yielding terrain.

An ellipse is a closed plane curve which is the path of a point the sum of whose distances from two fixed interior points, termed foci, is at all times constant. The addition of this curve-foci sum to the linear inter-foci distance gives a characteristic distance for a family of ellipses which reduces to twice the radius of the resulting circle when the inter-foci distance becomes zero and which becomes twice the length of the straight line resulting from maximum flattening of the ellipse when the linear inter-foci distance becomes a maximum and coincides with the flattened ellipse. An inter-foci distance which is small relative to the curve-foci sum produces an ellipse having nearly the appearance of a circle which is described as having low ellipticity, but a relatively large inter-foci distance produces an ellipse of strongly attenuated shape which is described as having high ellipticity.

A straight line drawn through the foci is known as the major axis of an ellipse, and a straight line drawn perpendicularly to the major axis through its midpoint between intersections with the ellipse curve is known as the minor axis. This midpoint is hereinafter termed the ellipse center. The length of the minor axis divided by the lentgh of the major axis gives a ratio which is commonly expressed as the angle whose tangent is that ratio. It is also obtainable by tilting a circle until a similar ellipse is seen by an observer. This angle is hereinafter referred to as the ellipticity of the ellipse.

A straight line, which is perpendicular to the minor axis, can be placed through the ellipse center at the same angular relationship to the major axis of the ellipse as the complement of its ellipticity. This relationship results in being able to construct a perpendicular having a length equal to one-half of the minor axis, from any point on the ellipse curve to the nearest part of the straight line. The ellipse can be the perimeter of an elliptically shaped rigid wheel, and the straight line passing through the ellipse center can be a rigid central axle which is rigidly connected to the wheel. A side view of this elliptical wheel and axle shows concentric circles. Rotation of the wheel causes the rim of the elliptical wheel to sweep through a cylinder of revolution. Rotation of the axle and an attached elliptical wheel when the wheel rim is in contact with the ground or other load-supporting surface results in a sine wave being described upon the ground by the moving point of contact of the wheel rim.

Planar elliptical wheels of any desired thickness can be formed from a circular cylinder by transversely cutting therethrough two or more parallel plane sections which are not perpendicular to the cylinder axis. If a pair of parallel plane sections, which are located at one end of this cylinder and are inclined to the cylinder axis at an acute angle, is matched by a similar pair of parallel plane sections which are inclined to the cylinder axis at the same angle but in the opposite direction and are located at the other end of the cylinder, and if a rigid central axle having a central axis which coincides with the cylinder axis is passed through, and rigidly attached to, both plane sections, without a change in positions thereof, to form a mutually opposed and rigidly aligned combination of two planar elliptical wheels which are rigidly connected by the central axle, an elliptical wheel-axle combination is created which fulfills the concept of this invention.

The objectives of this invention are attained by providing: (1) an elliptical wheel-axle combination comprising a pair of similar elliptical wheels which are attached in opposed relationship at the complement of their ellipticity to a central axle, and (2) a vehicle having an engine attached to the elliptical wheel-axle combination through a power-transfer means.

The invention may be understood more readily by referring to the drawings in which the same numbers are used for corresponding parts:

FIGURE 1A is a rear elevation view, by definition, of the basic elliptical wheel-axle combination of this invention, comprising a central axle and two attached elliptical wheels in opposed relationship, with the wheels slanting downwardly at an angle of 45° to the central axle.

FIGURE 1B is a right side elevation view of FIGURE 1A.

FIGURE 2A is a rear elevation view of the same axle and elliptical wheels as FIGURE 1A after rotation thereof of 180°, showing the wheels resting on a firm level surface.

FIGURE 2B is a right side elevation view of FIGURE 2A.

FIGURE 2C is a plan view of the outer face of the right-hand elliptical wheel of FIGURE 2A, looking in the direction of the arrows crossing the line 2C—2C in FIGURE 2A.

FIGURE 3 is a top view of the basic elliptical wheel-axle combination shown in FIGURE 2A and is also a top view of the track created by a rearward rolling movement of this elliptical wheel-axle combination.

FIGURE 7A is a rear elevation view of an embodiment of this invention having a power-transfer means on the axle and elliptical wheels of 60-degree ellipticity.

FIGURE 7B shows the outer face of the left-hand elliptical wheel shown in FIGURE 7A, looking in the direction of the arrows crossing the line 7B—7B in FIGURE 7A.

FIGURE 7C is a top view of the right-hand elliptical wheel shown in FIGURE 7A, looking in the direction of the arrows crossing the line 7C—7C in FIGURE 7A.

FIGURE 7D is a right side elevation view of the elliptical wheel-axle combination shown in FIGURE 7A.

FIGURE 8A is a rear elevation view of a single pair of opposed elliptical wheels of 45-degree ellipticity and an attached axle having a power-transfer means on the right side thereof.

FIGURE 8B is a rear elevation view of a paired elliptical wheel-axle combination exactly like FIGURE 8A except that the power-transfer means is on the left side of the elliptical wheels.

FIGURE 8C is a right side elevation view of FIGURES 8A and 8B.

FIGURE 9A is a rear elevation view of an embodiment having a conventional differential gear, an axle attached on each side thereof, and a multiplicity of elliptical wheels of about 10-degree ellipticity which are arranged in balanced groupings on each side of the differential gear, with a portion being 90° out of phase.

FIGURE 9B is a side elevation view of FIGURE 9A.

FIGURE 10A is an elevation view of an embodiment of a single elliptical wheel-axle combination of improved strength, comprising a portion of a central axle, an elliptical wheel of 45-degree ellipticity which is attached to the axle, and a strong plate which is rigidly attached to the axle and to the elliptical wheel.

FIGURE 10B shows one face of the elliptical wheel-axle combination of FIGURE 10A, looking in the direction of the arrows crossing the line 10B—10B in FIGURE 10A.

FIGURE 10C is a bottom view of the elliptical wheel-axle combination of FIGURE 10A, looking in the direction of the arrows crossing the line 10C—10C in FIGURE 10A.

FIGURE 10D is a side elevation view of the elliptical wheel-axle combination of FIGURE 10A, looking in the direction of the arrows crossing the line 10D—10D in FIGURE 10A.

Figure 4B:
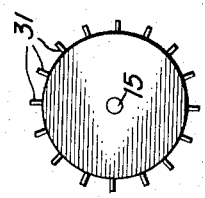
FIGURE 4B is a right side elevation view of the elliptical wheel-axle combination of FIGURE 4A.
Figure 5B:
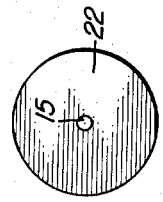
FIGURE 5B is a right side elevation view of the elliptical wheel-axle combination of FIGURE 5A.
Figure 6B:
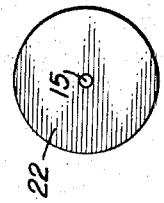
FIGURE 6B is a right side elevation view of FIGURE 6A.

Elliptical wheels of the instant invention are shown full face in FIGURES 2C and 10B for 45-degree ellipticity and in FIGURE 7B for 60-degree ellipticity. As shown in FIGURES 1A, 2A, and 3, for example, an elliptical wheel-axle combination comprises central axle 15 and elliptical wheels 21, 22 which are aligned to the central axle 15 and to the ground at the complement of the ellipticity and are aligned in mutually opposed position so that resisting forces which are exerted by the terrain upon surfaces of the elliptical wheels have inward or outward components in mutual opposition.

An elliptical wheel, such as right-hand elliptical wheel 22 shown in FIGURES 1A and 1B, has an inside face 23, an outside face 26, an outer rim 30, and an ellipse center 35. An elliptical wheel 22, as shown in FIGURES 2C, has a major axis 36 and a minor axis 37 which cross at the ellipse center 35. The outer rim 30 comprises an outer supporting section 30a which is bevelled at the complement of the ellipticity, an inner supporting section 30b which is bevelled at the complement of the ellipticity, two cutting sections 30c with no bevel, and four sections 30i with intermediate bevel, as shown in FIGURES 2A, 2B, and 2C. The supporting sections 30a and 30b are bisected by the major axis 36; the two cutting sections 30c are bisected by the minor axis 37.

When the axle 15 and wheels 21, 22 are rigidly connected and the axle 15 is rotated, the inside face 23 has a supporting area 23s adjacent to the bevelled outer rim section 30a and an impelling area 23p adjacent to a cutting section 30c. The outside face 26 has a supporting area 26s adjacent to the bevelled inner rim section 30b and an impelling area 26p adjacent to the remaining cutting section 30c as correctly shown in FIGURE 2C and in FIGURE 7B for forward impelling of the elliptical wheel-axle combination. The supporting areas 23s and 26s are bisected by the major axis 36; the impelling areas 23p and 26p are bisected by the minor axis 37. If the axle 15 is reversed as to rotational direction, the impelling areas 23p and 26p are moved to the corresponding areas on the other side of the ellipse center 35, but the supporting areas 23s and 26s are not affected.

When the elliptical wheel-axle combination of this invention is moved by rolling over a hard, level surface, a sine wave track 27 is generated, as shown in FIGURE 3 for backward movement. Track 27 has variable widths successively corresponding to the widths of the outer rim sections 30a, 30i, 30c, 30i, 30b, 30i, 30c, 30i and 30a. Amplitude and period of this sine wave are determined by wheel ellipticity and length of major axis 36 of elliptical wheel 22 when no slippage over the ground occurs.

When the elliptical wheel-axle combination of this invention impells an elliptical-wheeled vehicle over a hard, level surface, such as a concrete-surfaced road, frictional forces are developed along the wheel rims 30 which are perpendicular thereto. Impelling forces equal the sine of the ellipticity multiplied by these frictional forces. Sidewise forces, alternately inward and outward in direction, can be calculated as the cosine of the ellipticity multiplied by these frictional forces.

Figure 4A:
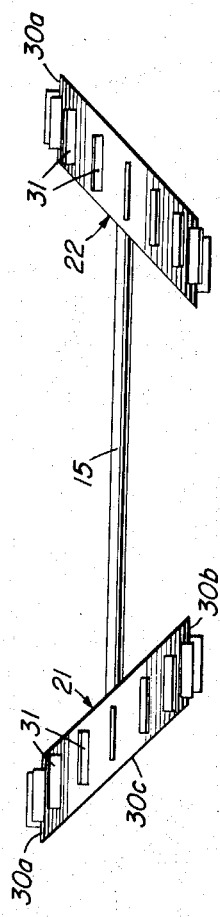
FIGURE 4A is a rear elevation view of an embodiment of the basic elliptical wheel-axle combination of this invention wherein the elliptical wheels are of 45-degree ellipticity and of substantial thickness to provide increased flotation and are equipped with treads, which are aligned parallel to the axle, to create increased impelling capability.
Figure 5A:
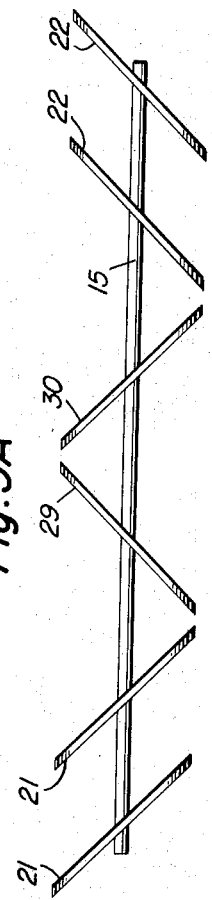
FIGURE 5A is a rear elevation view of another embodiment of the invention in which six thin elliptical wheels, all of 45-degree ellipticity, are attached to the same axle on each side thereof, with two elliptical wheels being 180° out of phase in opposed relationship and with all wheels being arranged in balanced relationship on each side of the axle.
Figure 6A:
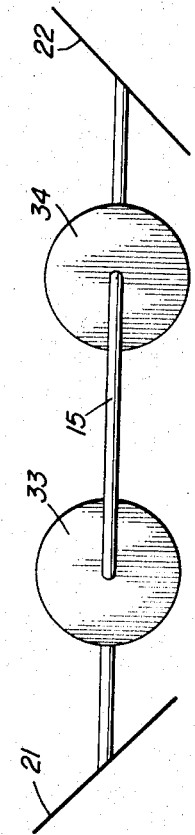
FIGURE 6A is a rear elevation view of another embodiment of the invention in which two pairs of thin elliptical wheels are attached to the central axle; all four elliptical wheels are of 45-degree ellipticity and in opposed relationship to another wheel of the same pair, but the pairs are 90° out of phase.

These wheels 21, 22 may be very thin, as shown in FIGURES 6A, of intermediate thickness as shown in FIGURES 1A and 2A, or exceptionally thick as shown in FIGURE 4A. The thicker wheels receive more flotation assistance from wheel thickness along the load-supporting outer rim 30. A thick wheel 21, 22, such as the wheel in FIGURE 4A, can also be constructed to be hollow or to be foam-filled for improved flotation in deep water, and treads 31 which are aligned parallel to the axle 15 can be added to the outer rim 30 for improved traction.

When yielding terrain permits the rim supporting sections 30a, 30b of elliptical wheels 21, 22 to penetrate its surface, a normal force is exerted upon surface 23 and outside surface 26 at load-supporting areas 23s and 26s. This normal force multiplied by the cosine of the complement of the ellipticity of wheels 21, 22 gives the resisting force which is available to support a vehicle because of wheel inclination relative to the terrain.

When yielding terrain permits the rim cutting sections 30c to penetrate its surface, a scooping action occurs as the impelling areas 23p, 26p of elliptical wheels 21, 22 begin to excavate a cylindrical trench in the yielding terrain. Considerable impelling force is thus generated. This impelling force can be calculated as the sine of the wheel ellipticity multiplied by the resisting force exerted perpendicularly against a surface 23 or 26 of wheel 21, 22 in impelling areas 23p or 26p.

A transverse force also exists which alternately tends to compress and stretch axle 15. During the supporting stage, this sidewise force can be calculated as the cosine of the wheel ellipticity multiplied by the resisting force which is exerted perpendicularly to each supporting area 23p and 26p. During the impelling stage, the transverse force can also be calculated as the cosine of the wheel ellipticity multiplied by the resisting force which is exerted perpendicularly to each impelling area 23p and 26p.

As intermediate rim sections 30i and supporting rim sections 30a or 30b of each elliptical wheed 21, 22 successively contact a yielding terrain, the soft surface thereof is increasingly and steadily penetrated less and less. The resisting force which is exerted perpendicularly against a surface 23 or 26 of an elliptical wheel 21, 22 is increasingly and steadily directed in a downward or upward direction, respectively, until an intermediate rim section 30i is replaced by a supporting rim section 30b or 30a, respectively, for forward movement of an elliptical wheel-axle combination such as shown in FIGURES 1 and 2, whereupon the resisting force is momentarily directed perpendicularly against rim 30 at that point of replacement and then is directed in a direction nearly 180° from its previous direction of resistance and against the other surface 26 or 23, respectively, of an elliptical wheel 21, 22.

The wheel means shown in FIGURES 8A and 8B operate in combination as cooperating vehicular driving means which can be powered by the same engine or by two engines. However, if separate axles 15 are used for constructing an elliptical wheel means, as in FIGURES 9A and 12, a powerful spreading force is created by a sidewise thrust on each wheel 21, 22, which is measurable as, for example, the cosine of the ellipticity times the force exerted normal to the areas 23p and 26p. Thrust bearings, which are not shown in the drawings, should be used, but the separate, balanced arrangement shown in FIGURES 8A and 8B is preferable if space permits. For the left-hand wheel means shown in FIGURE 8A, for example, elliptical wheel 21 is at all times balanced by elliptical wheel 29 so that no sidewise thrust is imparted to gear 16L.

Impelling and supporting forces can be smoothed as to frequency and severity by use of a multiplicity of elliptical wheels which are arranged in a staggered angular relationship, such as is shown in FIGURE 6A in which inner wheels 33, 34 are 90° out of phase with outer wheels 21, 22. Similar angular staggering is shown in FIGURE 9A where wheels 31, 32 are 90° out of phase with wheels 21, 22, 41, 42.

Figure 11:
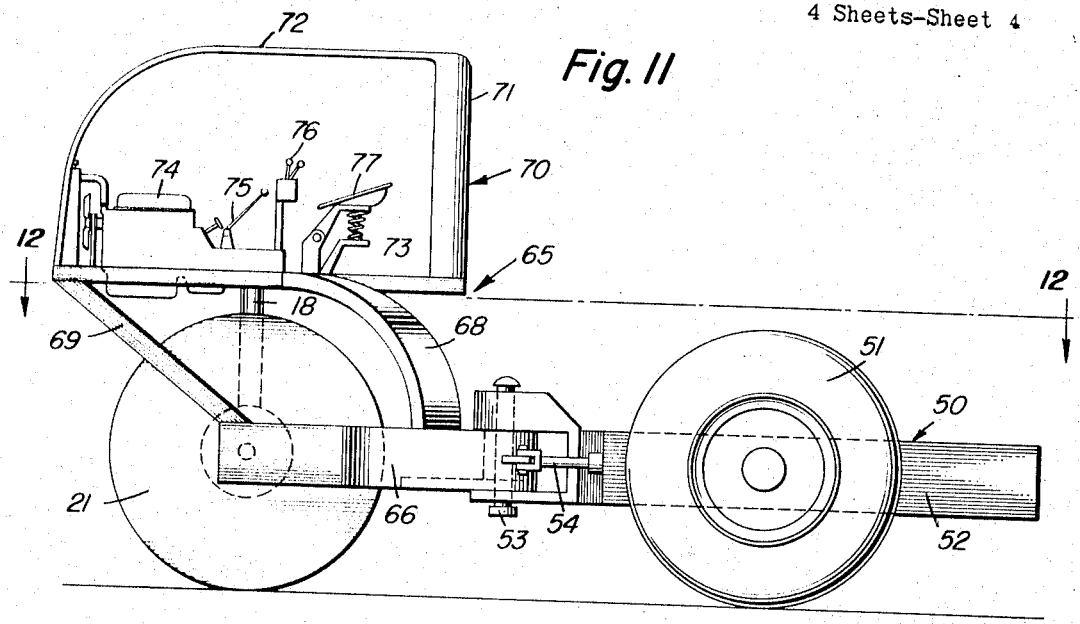
FIGURE 11 is a side elevation view of an elliptical-wheeled vehicle using the elliptical wheel-axle combination of this invention.
Figure 12:
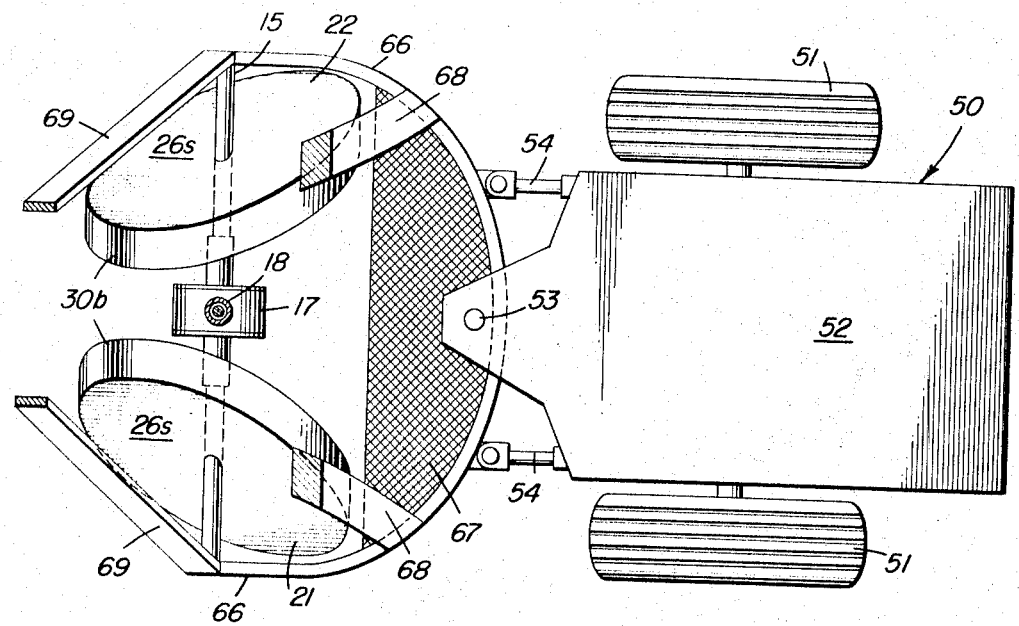
FIGURE 12 is a top sectional view of the elliptical-wheeled vehicle of FIGURE 11, looking in the direction of the arrows crossing the line 12—12 in FIGURE 11.

The elliptical-wheeled motor vehicle shown in FIGURES 11 and 12 is constructed in two articulated sections: the load-carrying body 50 and the propulsion section. The load-carrying body 50 has conventional wheels 51, flat bed 52, rear axle 55, and pinion 53.

The propulsion section comprises a drive unit 65 and and cab 70. The drive unit 65 comprises a semi-circular frame member 66, axle 15, which is rotatably attached to opposite ends of frame member 66, opposed planar elliptical wheels of 45° ellipticity and sustantial thickness which are rigidly attached to axle 15, a platform 67 which is rigidly attached to frame member 66 behind elliptical drive wheels 21, 22, which impel the vehicle forward or backward, rear cab support members 68, and forward cab support members 69. The axle 15 has a differential 17 at its midpoint. Differential 17 has an upwardly aligned drive shaft 18. Pinion 53 rotatably connects load-carrying body 50 and drive unit 65. Hydraulic pistons 54 steer this elliptical-wheeled vehicle.

Cab 70 is rigidly attached to and supported by support members 68, 69. Cab 70 has a rear wall 71, a top and forward shield 72, and floor 73. Within the cab 70 are engine 74, transmission 75, controls 76, and driver's seat 77. Controls 76 include hydraulic controls which are connected to hydraulic pistons 54 for steering the vehicle.

Elliptical-wheeled vehicles can be used for transportation across marshes, rice paddies, and other muddy areas, across snow-covered tundras, and across sandy deserts. Uses for the elliptical wheeled-axle combination of this invention include road grading, plowing, and brush clearing.

Soil-working uses are best carried out by an elliptical wheel-axle combination on a vehicle which is impelled and supported by conventional wheels so that the elliptical wheel-axle combination can be rotated at a different speed than the conventional wheels and raised and lowered with respect thereto. A plurality of elliptical wheel-axle combinations in staggered series, with a diversity of elliptical wheels on the axles, helps to obtain uniform soil surfaces.

Various modifications of the basic invention hereinbefore set forth and described may be made without departing from the spirit and scope of my invention. It is, therefore, to be understood that the invention is to be limited only according to the following claim.

I claim:

1. An elliptical-wheeled motor vehicle, comprising a load-carrying body and a propulsion section that comprises:
    (a) a semi-circular frame member that is centered on the fore-and-aft axis of said propulsion section and is hingeably connected to said load-carrying body, having arms that project away from said load-carrying body,
    (b) a power-transmitting axle that is rotatably attached to said arms,
    (c) a differential, at the midpoint of said axle, having an upwardly aligned driveshaft,
    (d) a pair of planar drive wheels, having the shape of an ellipse, which are rigidly attached, in opposed relationship at the complement of the ellipticity thereof, to said axle at the ellipse center, (e) a plurality of cab support members that are rigidly attached to said arms and incline upwardly and away from said load-carrying body,
(f) a cab that is rigidly attached to the upper ends of said cab support members,
(g) an engine that is rigidly attached to said cab, having a transmission to which said upwardly aligned driveshaft is attached.

References Cited

UNITED STATES PATENTS

| | | | |
|---|---|---|---|
| 1,074,596 | 10/1913 | Bechler | 280—80 |
| 2,683,495 | 7/1954 | Kopczynski | 180—7 |
| 3,160,220 | 12/1964 | Goulden | 180—7 |

LEO FRIAGLIA, *Primary Examiner.*